(12) United States Patent
Liu

(10) Patent No.: US 11,188,160 B1
(45) Date of Patent: Nov. 30, 2021

(54) WIRELESS CONTROLLING SYSTEM IMPLEMENTED WITH SMART RING AND WIRELESS CONTROLLING METHOD THEREOF

(71) Applicant: RockRocket Co., Ltd., New Taipei (TW)

(72) Inventor: Yung-Hao Liu, New Taipei (TW)

(73) Assignee: ROCKROCKET CO., LTD., New Taipei (TW)

( * ) Notice: Subject to any disclaimer, the term of this patent is extended or adjusted under 35 U.S.C. 154(b) by 0 days.

(21) Appl. No.: 17/212,755

(22) Filed: Mar. 25, 2021

(51) Int. Cl.
  *G06F 3/0346* (2013.01)
  *G06F 3/01* (2006.01)
  *G06F 3/038* (2013.01)
  *H04W 88/02* (2009.01)

(52) U.S. Cl.
  CPC ............ *G06F 3/0346* (2013.01); *G06F 3/014* (2013.01); *G06F 3/017* (2013.01); *G06F 3/038* (2013.01); *G06F 2203/0331* (2013.01); *G06F 2203/0384* (2013.01); *H04W 88/02* (2013.01)

(58) Field of Classification Search
  CPC ........... G06F 3/046; G06F 3/017; G06F 3/038
  USPC .......................................... 345/156, 173–174
  See application file for complete search history.

(56) References Cited

U.S. PATENT DOCUMENTS

| | | | |
|---|---|---|---|
| 2017/0251268 A1* | 8/2017 | Zhao ................... | H04N 21/4126 |
| 2019/0327124 A1* | 10/2019 | Lai ......................... | H04L 27/362 |
| 2020/0380178 A1* | 12/2020 | Santarone ........... | G08B 21/0275 |
| 2020/0404077 A1* | 12/2020 | Jiang .................... | G06F 16/9035 |

* cited by examiner

*Primary Examiner* — Calvin C Ma
(74) *Attorney, Agent, or Firm* — Chun-Ming Shih; HDLS IPR Services

(57) ABSTRACT

A wireless controlling system including a smart ring and an identification program installed in a mobile device is disclosed. The ring includes an MCU, a six-axis accelerometer, a transmitting unit and a storage. The storage stores multiple gesture models respectively corresponding to different moving trajectories. When a user moves with the ring, the six-axis accelerometer continuously detects a set of moving signals of the ring. The MCU continuously determines whether the set of moving signals matches any moving trajectory of the gesture models. When a gesture model is matched, the MCU sends a gesture command corresponding to the matched gesture model to the mobile device through the transmitting unit. The mobile device analyzes the gesture command to obtain a corresponding operation command through the identification program, and the mobile device is being controlled to execute a corresponding function in accordance with the operation command.

13 Claims, 8 Drawing Sheets

WIRELESS CONTROLLING SYSTEM IMPLEMENTED WITH SMART RING AND WIRELESS CONTROLLING METHOD THEREOF

BACKGROUND OF THE DISCLOSURE

Technical Field

This disclosure relates to a controlling system, and specifically relates to a wireless controlling system implemented with a smart ring and a wireless controlling method thereof.

Description of Related Art

According to the development of the semiconductor process and the Internet, the ability and function of intelligent mobile devices are improved which may now compete with personal computers (PCs) or laptops.

The related-art intelligent mobile devices such as smart phones, tablets, etc., may be used to execute multiple functions. Besides, the intelligent mobile devices have the size smaller than that of PCs and laptops, which is more convenient to be carried and used. Nowadays, these kinds of intelligent mobile devices are substituting traditional PCs and laptops.

In comparison with PCs and laptops, the intelligent mobile devices receive user's operations to execute corresponding functions through a touch screen. It is convenient to operate through the touch screen, however, the users may have difficulty to operate the intelligent mobile devices under specific circumstances.

For example, the intelligent mobile devices may be used to open a document for briefing, however, when a user stands on the stage for briefing, it is difficult for the user to touch the touch screen of the intelligent mobile devices, so the user usually needs someone's help to change pages for briefing. For another example, the intelligent mobile devices may be used to send out an SOS message under an emergent situation, however, it is difficult for the user to touch the touch screen of the intelligent mobile devices when the user is in the emergency, such as car accident or kidnapping. Therefore, the aforementioned functions of the intelligent mobile devices may not be useful.

According to the above discussion, a controlling system is needed in the market which may assist the users to control the intelligent mobile devices flexibly.

SUMMARY OF THE DISCLOSURE

The disclosure is directed to a wireless controlling system implemented with a smart ring and a wireless controlling method thereof, which allows a user to control an intelligent mobile device directly by gestures and make the intelligent mobile device execute corresponding functions.

In one of the exemplary embodiments, the wireless controlling system includes: an identification program installed and executed by a mobile device; and a smart ring communicated with the mobile device, and includes: a six-axis accelerometer sensing a movement of the smart ring in a three-dimensional space and generating a set of moving signals; a storage recording multiple gesture models, each of the gesture models respectively corresponding to a moving trajectory; an MCU electrically connected with the six-axis accelerometer and the storage, continuously receiving the set of moving signals and determining whether the set of moving signals matches one of the multiple gesture models, and obtaining a gesture command corresponding to a specific gesture model of the multiple gesture models when the set of moving signals matches the specific gesture model; and a transmitting unit electrically connected with the MCU, wirelessly transmitting the gesture command to the mobile device; wherein, the mobile device is configured to analyze the gesture command to obtain an operation command corresponding to the gesture command through the identification program, and the mobile device is being controlled to execute a corresponding function according to the operation command.

In one of the exemplary embodiments, the wireless controlling method is incorporated with the wireless controlling system and includes following steps: a) sensing a movement of the smart ring in a three-dimensional space and generating a set of moving signals by the six-axis accelerometer; b) continuously receiving the set of moving signals by the MCU, and determining whether the set of moving signal matches one of multiple gesture models stored in the storage, wherein each of the gesture models respectively corresponds to a moving trajectory; c) obtaining a gesture command corresponding to a specific gesture model of the multiple gesture models when the set of moving signals is determined to be matching the specific gesture model; d) wirelessly transmitting the gesture command to the mobile device by the transmitting unit; e) analyzing the gesture command to obtain an operation command by the identification program; and f) controlling the mobile device to execute a corresponding function according to the operation command.

This disclosure may trace the movement of user's hand and analyze user's gesture through the smart ring, and the smart ring sends a corresponding gesture command to the mobile device. The mobile device may analyze the gesture command through the identification program and execute a corresponding function. In comparison with related art, the user may control the mobile device when the user is unable to touch the mobile device. Therefore, the mobile device is more convenient to be used, and the functions of the mobile device may be executed fluently in any unpredictable circumstances.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses a wireless controlling system implemented with a smart ring, which is suitable for any kind of intelligent mobile device such as a smart phone, a tablet, etc. A user may use different gestures to wirelessly control the mobile device when the user is unable to touch the mobile device.

Figure 1:
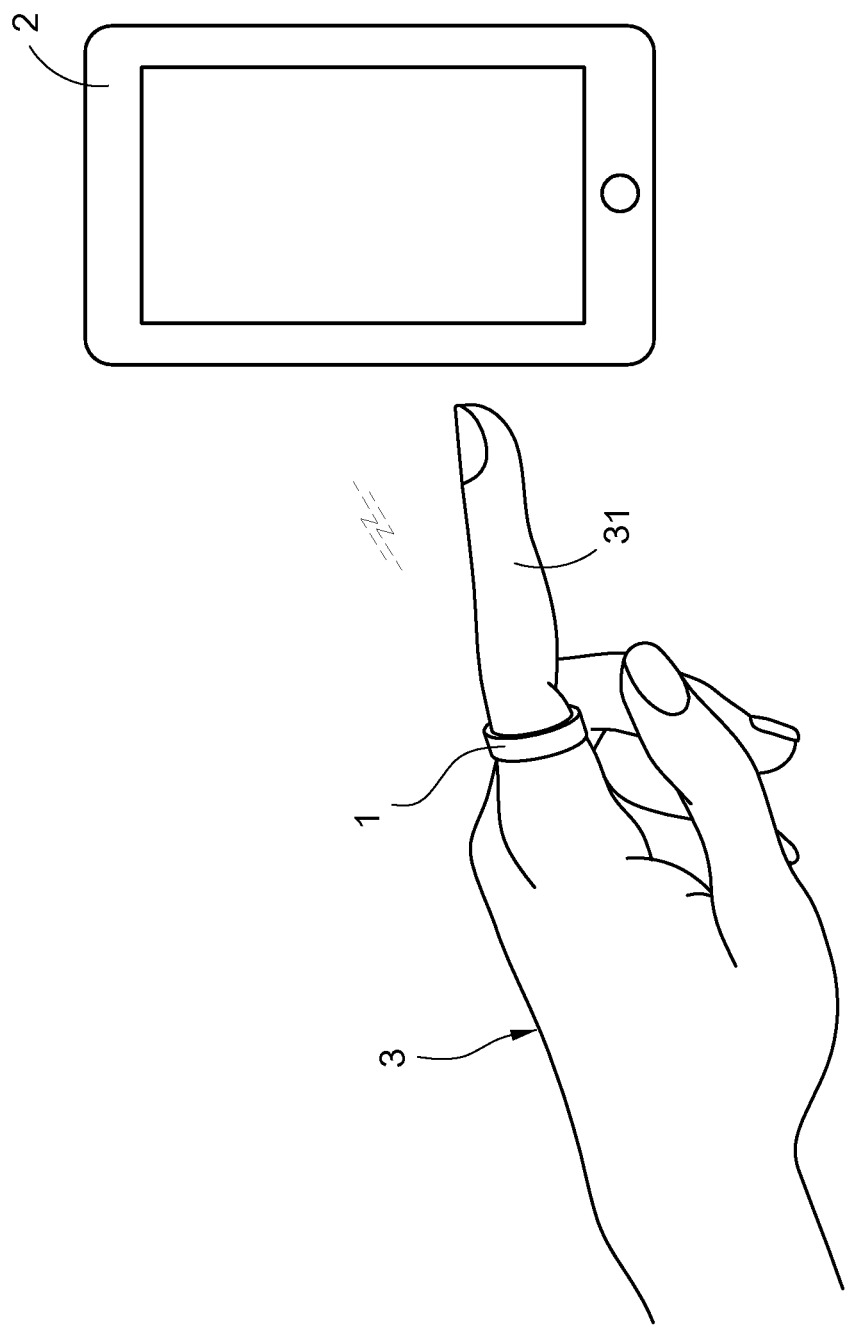
FIG. 1 is a schematic diagram showing an operation of a smart ring according to this disclosure.

Refer to FIG. 1, which is a schematic diagram showing an operation of a smart ring according to this disclosure. The wireless controlling system in this disclosure includes a smart ring 1 and an identification program paired with the smart ring 1 (such as the identification program 241 shown in FIG. 2). The identification program 241 is installed in and executed by an intelligent mobile device 2 (referred to as the mobile device 2 hereinafter).

In particular, the identification program 241 is created and provided by a developer of the smart ring 1, and the user may manually download and install the identification program 241 to the mobile device 2 owned by the user. After executing the identification program 241, the mobile device 2 may identify the smart ring 1 through the identification program 241 and establish a connection with the smart ring 1.

In one of the exemplary embodiments, the smart ring 1 is worn by a user 3 on a finger 31, and is communicated with the mobile device 2. The smart ring 1 continuously detects a moving trajectory of an arm, a wrist, a palm, and the finger 31 of the user 3, and determines whether a specific gesture is made by the user 3 according to the detected moving trajectory.

When the user 3 makes one gesture of a plurality of pre-defined gestures, the smart ring 1 may send a corresponding gesture command C1 to the mobile device 2. The mobile device 2 receives the gesture command C1 and analyzes the gesture command C1 through the identification program 241 to obtain an operation command that corresponds to the received gesture command C1. Also, the identification program 241 may control the mobile device 2 to execute a corresponding function according to the operation command. By using the smart ring 1 and the identification program 241, the wireless controlling system of this disclosure may fulfill a specific purpose that allows the user 3 to directly control the mobile device 2 without touching the mobile device 2.

Figure 2:
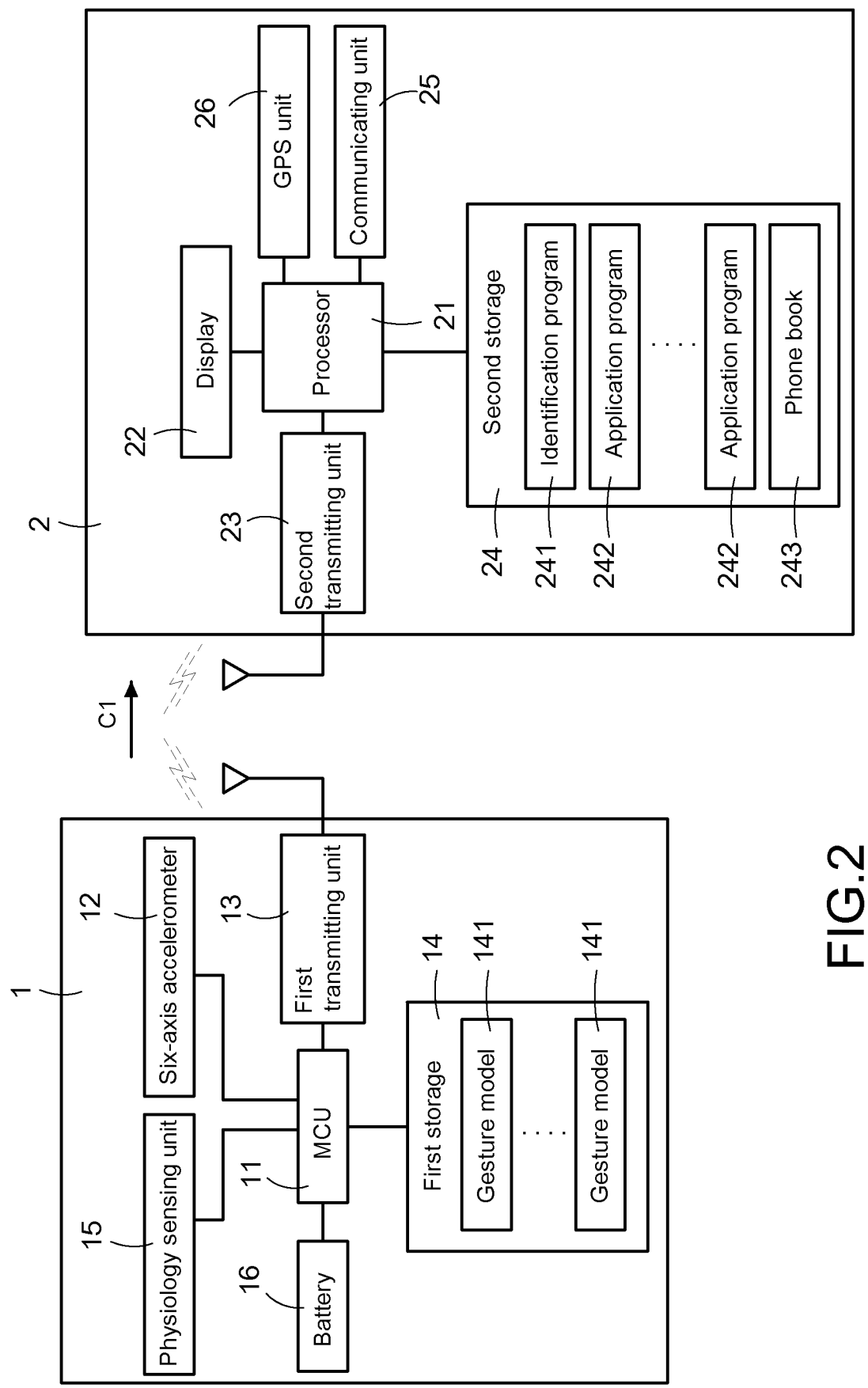
FIG. 2 is a block diagram of the smart ring in a first embodiment according to this disclosure.

Refer to FIG. 2, which is a block diagram of the smart ring in a first embodiment according to this disclosure. As disclosed in FIG. 2, the smart ring 1 may include a micro control unit (MCU) 11, a six-axis accelerometer 12, a first transmitting unit 13 and a first storage 14. The six-axis accelerometer 12, the first transmitting unit 13 and the first storage 14 are electrically connected with and controlled by the MCU 11.

The mobile device 2 may include a processor 21, a display 22, a second transmitting unit 23 and a second storage 24. The display 22, the second transmitting unit 23 and the second storage 24 are electrically connected with and controlled by the processor 21. As shown in FIG. 2, the identification program 241 is installed and stored in the second storage 24. After the mobile device 2 executes the identification program 241, the mobile device 2 may establish a communication with the smart ring 1 through the second transmitting unit 23, and receive and process the gesture command C1 sent by the smart ring 1 through the first transmitting unit 13 (detailed described in the following).

As shown in FIG. 1, the smart ring 1 may be worn by the user 3 on any finger 31. One technical feature of this disclosure is that, when the user 3 moves with the smart ring 1, the smart ring 1 may continuously detect the movement of the smart ring 1 in the three-dimensional space through the six-axis accelerometer 12 and generate corresponding moving signals. More specific, the six-axis accelerometer 12 may continuously sense the movement of the smart ring 1 on the preset X-axis, Y-axis, and Z-axis (not shown) following the movement of user's hand, and generate corresponding signals in six directions including front, back, left, right, up and down. In one of the exemplary embodiments, a set of moving signals indicates a series of continuous data assembled by the signals in the six directions.

Another technical feature of this disclosure is that, the developer of the smart ring 1 may pre-test and record moving trajectories for the user 3 of making specific gestures, create multiple gesture models 141 based on the moving trajectories, and pre-record the gesture models 141 to the first storage 14 of the smart ring 1.

When the user 3 wears the smart ring 1 and moves the hand with the smart ring 1, the smart ring 1 may continuously detect the movement and generate a corresponding set of moving signals through the six-axis accelerometer 12. Moreover, the MCU 11 may continuously receive the set of moving signals from the six-axis accelerometer 12, and determine whether the received set of moving signals matches any one of the multiple gesture models 141 stored in the first storage 14. When the MCU 11 determines that the set of moving signals matches one of the multiple gesture models 141, it indicates that the gesture made by the user 3 at the very time matches one gesture pre-defined by the developer. Therefore, the MCU 11 obtains one gesture command C1 that corresponds to the matched gesture model 141.

In one of the exemplary embodiments, the gesture is made by the user 3 with the hand wearing the smart ring 1. For example, the user 3 may horizontally move the finger 31 from a point A to a point B in the three-dimensional space, vertically move the finger 31 from an A point to a B point in the three-dimensional space, make a circle by the finger 31 in the three-dimensional space, make a press action by the finger 31, make a first action, swing the arm by a certain angle, etc. However, the above descriptions are only few embodiments, the scope of this disclosure is not limited to the aforementioned actions.

In this disclosure, each of the gesture models 141 is respectively corresponded to a gesture command C1. When the MCU 11 determines that the set of moving signals at the very time matches one of the multiple gesture models 141 and generates the gesture command C1 that corresponds to the matched gesture model 141, the smart ring 1 wirelessly transmits the gesture command C1 to the mobile device 2 through the first transmitting unit 13. In one of the exemplary embodiments, the first transmitting unit 13 may be any kind of wireless transmitting unit, such as a Wi-Fi transmitting unit, a near field communication (NFC) transmitting unit, a radio frequency (RF) transmitting unit, a Zigbee transmitting unit, a Bluetooth low energy (BLE) transmitting unit, etc., but not limited thereto.

When the identification program 241 is executed by the mobile device 2, the mobile device 2 receives the gesture command C1 sent from the smart ring 1 through the second transmitting unit 23. Therefore, the mobile device 2 may analyze the received gesture command C1 through the identification program 241, so as to obtain an operation command that corresponds to the received gesture command C1. In this embodiment, the form or type of the second transmitting unit 23 is same as the form or type of the first transmitting unit 13.

In one of the exemplary embodiments, the operation command may be, for example, a primitive command of the mobile device 2, and the operation command is used to simulate the scenario that the user 3 uses the finger 31 to directly touch the display 22 of the mobile device 2 to perform touch operations. For example, the operation command may be a command for swipe-left, swipe-right, swipe-in from the outside of the display 22, swipe-down from the top of the display 22, pressing the display 22, etc., but not limited thereto.

In one of the exemplary embodiments, the operation command may be a control command, such as transmitting specific data back to the smart ring 1, activating specific application program 242 inside the mobile device 2, opening specific function of the mobile device 2 (such as adjusting volume, adjusting brightness, voice input, etc.), sent by the identification program 241 to the mobile device 2. The above descriptions are only few embodiments of this disclosure, but not limited thereto.

The identification program 241 may pre-record a lookup table (not shown in the FIGs), the lookup table may record corresponding relationships between each of the multiple gesture commands C1 and each of the multiple operation commands. The multiple operation commands may be varied due to different brands, models, and operating systems (OSs) of the mobile device 2. In this disclosure, the identification program 241 may inquire the lookup table according to a gesture command C1 received by the second transmitting unit 23, so as to obtain an operation command that corresponds to the received gesture command C1. Also, the identification program 241 may make the processor 21 of the mobile device 2 to execute the operation command, so the mobile device 2 may execute a corresponding function in accordance with the operation command.

As shown in FIG. 2, the smart ring 1 of the wireless controlling system may include a physiology sensing unit 15 electrically connected with the MCU 11. The physiology sensing unit 15 may be, for example, an infrared rays (IR) sensor, a temperature sensor, etc., but not limited. When the user 3 wears the smart ring 1 on the finger 31, the physiology sensing unit 15 of the smart ring 1 may sense a physiological data of the user 3, such as heartbeat, body temperature, etc. In this embodiment, the smart ring 1 may transmit the sensed physiological data to the mobile device 2 through the first transmitting unit 13. Therefore, the mobile device 2 may launch a certain displaying page (not shown) on the display 22 through the identification program 241 to present the physiological data of the user 3.

As shown in FIG. 2, the smart ring 1 of the wireless controlling system may include a battery 16 electrically connected with the MCU 11. The battery 16 is used to provide power to the smart ring 1 for operation.

As shown in FIG. 2, in addition to the identification program 241, the mobile device 2 may also install multiple application programs 242, each of the application programs 242 is respectively stored in the second storage 24 after being installed.

In a first embodiment of the disclosure, the application programs 242 may include a communication program. In this embodiment, the user 3 may make a specific gesture with the smart ring 1, and the smart ring 1 may send out a specific gesture command according to the specific gesture made by the user 3. The identification program 241 may obtain an operation command that corresponds to the specific gesture command sent from the smart ring 1, and then controls the mobile device 2 to launch the communication program, to answer a phone call, to open a phone book, to select a contact person, to make a phone call, to hang up a phone call, etc.

In a second embodiment of the disclosure, the application programs 242 may include a navigation program. In this embodiment, the user 3 may make a specific gesture with the smart ring 1, and the smart ring 1 may send out a specific gesture command according to the specific gesture made by the user 3. The identification program 241 may obtain an operation command that corresponds to the specific gesture command sent from the smart ring 1, and then controls the mobile device 2 to launch the navigation program, to activate a voice input procedure, to confirm a navigation location, etc.

In a third embodiment of the disclosure, the application programs 242 may include a briefing program. In this embodiment, the user 3 may make a specific gesture with the smart ring 1, and the smart ring 1 may send out a specific gesture command according to the specific gesture made by the user 3. The identification program 241 may obtain an operation command that corresponds to the specific gesture command sent from the smart ring 1, and then controls the mobile device 2 to launch the briefing program, to open a specific document, to control a cursor, etc.

In a fourth embodiment of the disclosure, the application programs 242 may include an internet of thing (IoT) equipment controlling program that is used for controlling IoT equipment (such as "Home" app of the Android system or the iOS system). In this embodiment, the user 3 may make a specific gesture with the smart ring 1, and the smart ring 1 may send out a specific gesture command according to the specific gesture made by the user 3. The identification program 241 may obtain an operation command that corresponds to the specific gesture command sent from the smart ring 1, and then controls the mobile device 2 to launch the IoT equipment controlling program, to connect to a specific IoT equipment, to control the connected IoT equipment, etc.

In a fifth embodiment of the disclosure, the application programs 242 may include an emergency contact program. In this embodiment, the user 3 may make a specific gesture with the smart ring 1, and the smart ring 1 may send out a specific gesture command according to the specific gesture made by the user 3. The identification program 241 may obtain an operation command that corresponds to the specific gesture command sent from the smart ring 1, and then controls the mobile device 2 to launch the emergency contact program, to send out an SOS message through the emergency contact program, etc.

Specifically, as shown in FIG. 2, the mobile device 2 may also include a communicating unit 25 electrically connected with the processor 21. The mobile device 2 may communicate with the other communication apparatus through the communicating unit 25, and may transmit text message to the other communication apparatus. One technical feature of this disclosure is that, when the identification program 241 determines that the gesture command C1 sent from the smart ring 1 is a specific gesture command (for example, a fisting command or a swing command, detailed discussed below), the identification program 241 identifies that the user 3 is in an emergency, such as falling down, disputing with someone, being bullied or kidnaped, etc. Therefore, the identification program 241 may control the mobile device 2 to make a phone call or send a text message through the communication unit 25, and to automatically send out an SOS message for the user 3.

In one of the exemplary embodiments, the mobile device 2 may record a phone book 243 in the second storage 24. In this embodiment, when the identification program 241 determines that the user 3 is in an emergency, the identification program 241 may obtain a contact information (such as a telephone number) of an emergency contact person (such as family, police office, hospital, etc.), and control the mobile device 2 to make a phone call or to send out a text message to the emergency contact person through the communicating unit 25.

In another one of the exemplary embodiments, the mobile device 2 also includes a global positioning system (GPS) unit 26 electrically connected with the processor 21, and the GPS unit 26 is used to position the current location of the mobile device 2 and generate a corresponding positioning information. In this embodiment, when the identification program 241 determines that the user 3 is in an emergency, the identification program 241 may obtain the positioning information of the mobile device 2 at the very time through the GPS unit 26, and generate the operation command based on the positioning information. In this embodiment, the mobile device 2 may send out an SOS message through the communicating unit 25. The content of the SOS message includes the positioning information of the mobile device 2. According to the positioning information, the emergency contact person may directly know the location of the user 3 at the very time after receiving the SOS message, and may rescue the user 3 as soon as possible.

Figure 3:
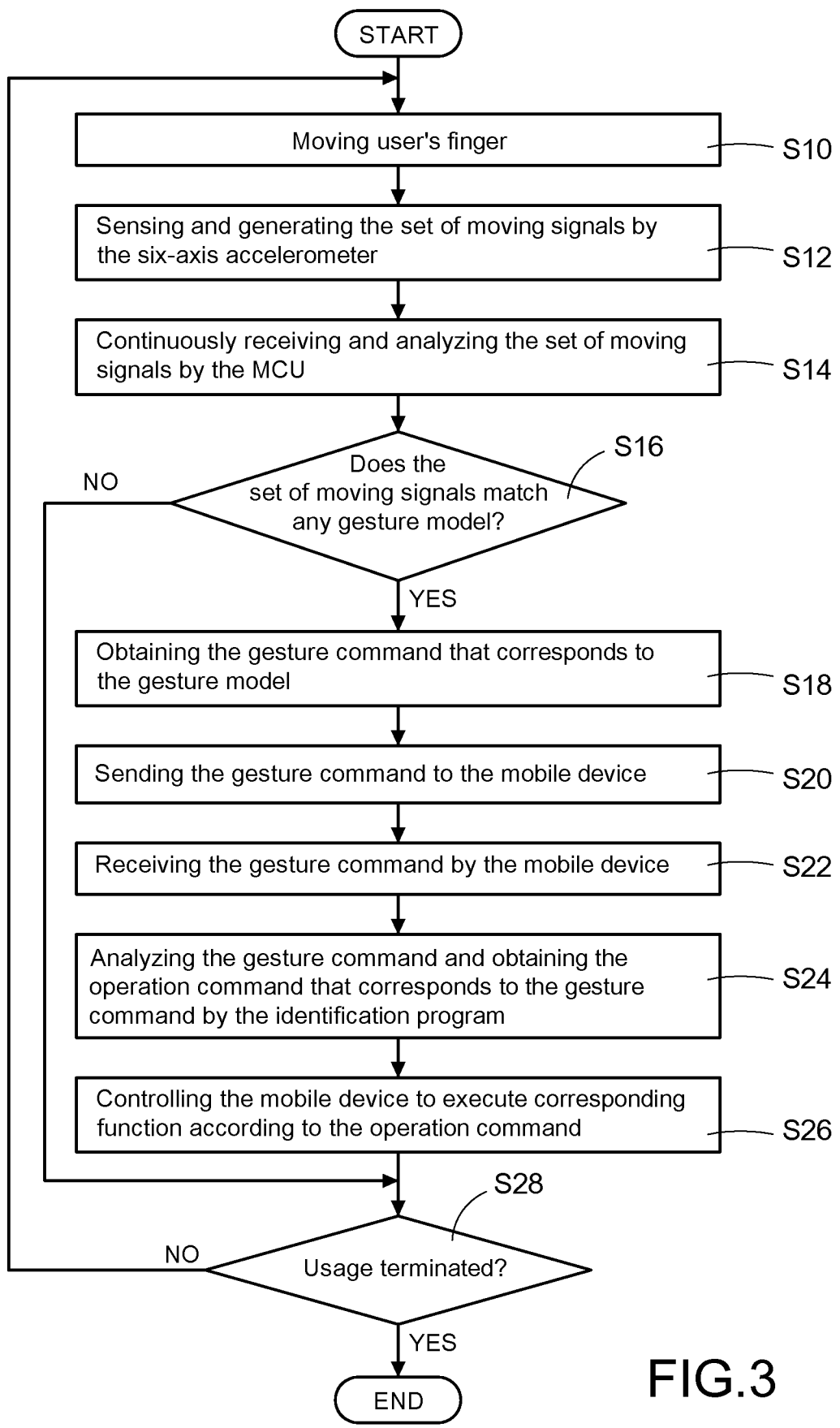
FIG. 3 is a flowchart of a controlling method in a first embodiment according to this disclosure.

Refer to FIG. 3, which is a flowchart of a controlling method in a first embodiment according to this disclosure. FIG. 3 discloses a wireless controlling method of this disclosure, and the wireless controlling method is incorporated with the wireless controlling system as shown in FIG. 1 and FIG. 2, and is implemented with the smart ring 1 and the identification program 241 of the wireless controlling system.

As shown in FIG. 3, a user 3 may wear the smart ring 1 on the finger 31 and then move the finger 31 (step S10). When the user 3 moves the finger 31, the smart ring 1 continuously senses the movement of the smart ring 1 in the three-dimensional space through the six-axis accelerometer 12, and generates a corresponding set of moving signals (step S12). In particular, the six-axis accelerometer 12 may sense the movement and the rotation of user's hand, and then generate the set of moving signals according to the directions toward front, back, left, right, up and down.

After the step S12, the smart ring 1 continuously receives and analyzes the set of moving signals through the MCU 11 (step S14), and determines whether the set of moving signals matches any gesture models 141 stored in the first storage 14 (step S16). If the received set of moving signals at the very time does not match any gesture model 141, the smart ring 1 does not send out any gesture command C1.

If the set of moving signals is determined to be matching a specific gesture model in the multiple gesture models 141 in the step S16, the MCU 11 of the smart ring 1 further obtains a gesture command C1 that corresponds to the specific gesture model (step S18), and then the smart ring 1 wirelessly sends the gesture command C1, through the first transmitting unit 13, to the mobile device 2 in which the identification program 241 (step S20) is installed.

As discussed above, the first storage 14 pre-stores multiple gesture models 141, and each of the gesture models 141 respectively corresponds to different moving trajectories. In the step S16, the MCU 11 may determine whether the moving action of the user's hand matches any moving trajectory recorded in any gesture models 141 through the set of moving signals, and determine that the user 3 makes a specific gesture when the moving action of the user 3 is determined to be matching the moving trajectory of one of the gesture models 141. Therefore, the MCU 11 identifies the matched gesture model 141 as the specific gesture model mentioned above, and obtains the gesture command C1 that corresponds to the specific gesture model.

In one of the exemplary embodiments, the specific gesture may be, for example, moving horizontally, moving vertically, fisting, swinging, circling, clicking, etc., and the gesture command C1 may be, for example, a horizontal moving command, a vertical moving command, a fisting command, a swinging command, a circling command, a clicking command, etc., but not limited thereto.

After the step S20, the mobile device 2 may receive the gesture command C1 sent from the smart ring 1 through the second transmitting unit 23 (step S22), and the identification program 241 executed in the mobile device 2 may analyze the received gesture command C1, and then obtain an operation command that corresponds to the gesture command C1 (step S24).

In one of the exemplary embodiments, the identification program 241 may inquire a lookup table according to the received gesture command C1, so as to obtain the operation command that corresponds to the gesture command C1. For example, the horizontal moving command may correspond to a swipe-left operation command or a swipe-right operation command, the vertical moving command may correspond to a swipe-up operation command or a swipe-down operation command, the fisting command and the swinging command may respectively correspond to an operation command for sending out an SOS message, the circling command may correspond to an operation command for controlling a cursor, the clicking command may correspond to an operation command for triggering an application program 242. The above descriptions are only few embodiments of this disclosure, but not limited thereto.

After the step S24, the identification program 241 triggers the processor 21 of the mobile device, so the processor 21 controls the mobile device 2 to execute a corresponding function according to the operation command (step S26). In one of the exemplary embodiments, the processor 21 may control the mobile device 2 according to the operation command, so as to execute a primitive function of the mobile device 2 (such as swipe-left and swipe-right), to activate an application program 242, to execute a function of the application program 242, to send out an SOS message, etc., but not limited thereto.

In one of the exemplary embodiments, the smart ring 1 may continuously determine whether the usage of the user 3 is terminated after the smart ring 1 is activated (step S28), and continuously execute the step S10 to the step S26 before the user 3 terminates the usage of the smart ring 1. For example, the smart ring 1 may determine whether the user 3 turns off the smart ring 1 through the MCU 11, or determine whether the user 3 takes off the smart ring 1 from the finger 31 through the six-axis accelerometer 12 or the physiology sensing unit 15. Also, the smart ring 1 may terminate the wireless controlling method when the usage of the smart ring 1 is ended.

In the step S12, the smart ring 1 may sense the hand moving trajectory of the user 3 and generate a corresponding set of moving signals through the six-axis accelerometer 12. In the step S16, the smart ring 1 may compare the set of moving signals with multiple pre-defined gesture models 141 through the MCU 11.

Different users may have different moving postures. Moreover, the same user 3 may use the same smart ring 1 in different environments or scenarios. For example, the user 3 may use the smart ring 1 while sitting or while standing. Therefore, the moving signals generated by the smart ring 1 may be varied. On the other hand, when the user 3 wears the smart ring 1, the user 3 may still move the finger 31 due to different reasons and accidentally trigger the smart ring 1.

In order to solve the aforementioned problems and prevent the smart ring 1 from being accidentally triggered, the smart ring 1, in the above step S14, may perform a first stage of diagnosis procedure to the set of moving signals through the MCU 11. Therefore, the smart ring 1 may be suitable for different users, and may be used by the same user 3 in different environments or scenarios.

Figure 4A:
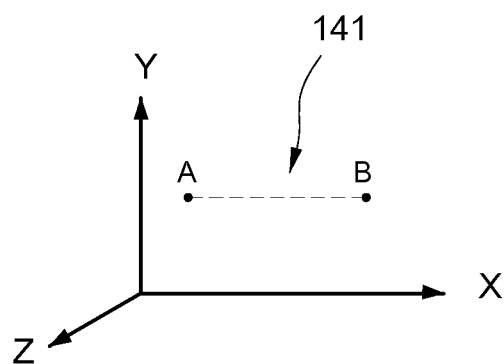
FIG. 4A is a schematic diagram showing a gesture model in a first embodiment according to this disclosure.
Figure 4B:
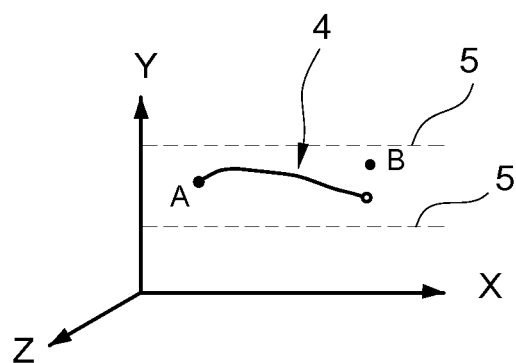
FIG. 4B is a schematic diagram showing the gesture model in a second embodiment according to this disclosure.
Figure 4C:
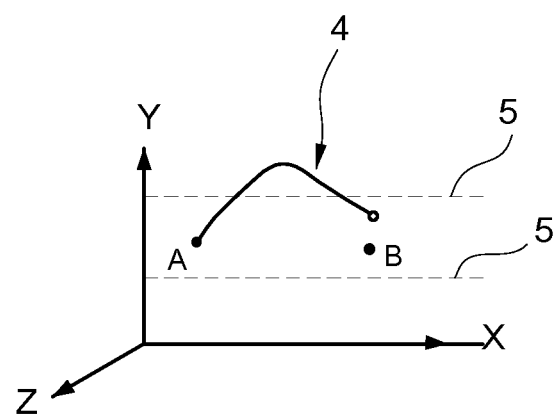
FIG. 4C is a schematic diagram showing the gesture model in a third embodiment according to this disclosure.

Please refer to FIG. 4A, FIG. 4B, and FIG. 4C, wherein FIG. 4A to FIG. 4C are schematic diagrams respectively showing a gesture model in a first embodiment, a second embodiment, and a third embodiment.

FIG. 4A shows a gesture model 141 stored in the first storage 14 which records a moving trajectory indicating "moving horizontally from a point A in a three-dimensional space to a point B in the three-dimensional space".

FIG. 4B shows a moving trajectory 4 generated by the smart ring 1 according to the hand movement of the user 3. Due to the operation of the user 3, the moving trajectory 4 of the smart ring 1 may be different from the content recorded in the gesture model 141. As the example shown in FIG. 4B, it is difficult for the user 3 to draw a straight line in the air by the finger 31. If the moving trajectory 4 of the smart ring 1 requires 100% matching the content recorded in the gesture model 141 to trigger a corresponding command, the smart ring 1 is inconvenient for usage.

One technical feature of this disclosure is that, the MCU 11 may provide a signal tolerance range 5 to the set of moving signals within a certain level. If every point in the set of moving signals is located within the signal tolerance range 5, the MCU 11 may identify the set of moving signals to be valid. On the other hand, if the variation of the set of moving signals is greater than the signal tolerance range 5 (i.e., a part of the points in the set of moving signals exceeds the signal tolerance range 5), the MCU 11 may identify the set of moving signals as an accidental triggering from the user 3, and the MCU 11 does not obtain any gesture command C1 according to the set of moving signals.

In one of the exemplary embodiments, the MCU 11 may obtain a moving start point (such as the point A in FIG. 4B) of the smart ring 1 in the three-dimensional space to perform an analysis, and identify a range of a certain distance above the moving start point (such as 15 cm above the moving start point) and below the moving start point (such as 15 cm below the moving start point) as the signal tolerance range 5 of the set of moving signals. If the variation of the user's hand moving from the point A to the point B is not exceeding the signal tolerance range 5 (i.e., every point in the movement from the point A to the point B is located within the signal tolerance range 5), the MCU 11 does not identify the set of moving signals as an accidental triggering.

When the set of moving signals is identified to be valid, the MCU 11 computes a signal average of the set of moving signals. For example, the MCU 11 may compute an average value of a highest signal and a lowest signal of the moving signals. Next, the MCU 11 may compare the signal average with each of the multiple pre-stored gesture models 141.

As shown in FIG. 4C, if the smart ring 1 is moved with the movement of the user 3 from a moving start point (such as the point A in FIG. 4C) to a moving termination point (such as the point B in FIG. 4C) of the three-dimensional space, but the upward variation or the downward variation of the moving trajectory 4 exceeds the signal tolerance range 5, i.e., a part of the points of the movement from the A point to the B point exceeds the signal tolerance range 5, the MCU 11 identifies the set of moving signals as an accidental triggering.

Figure 5:
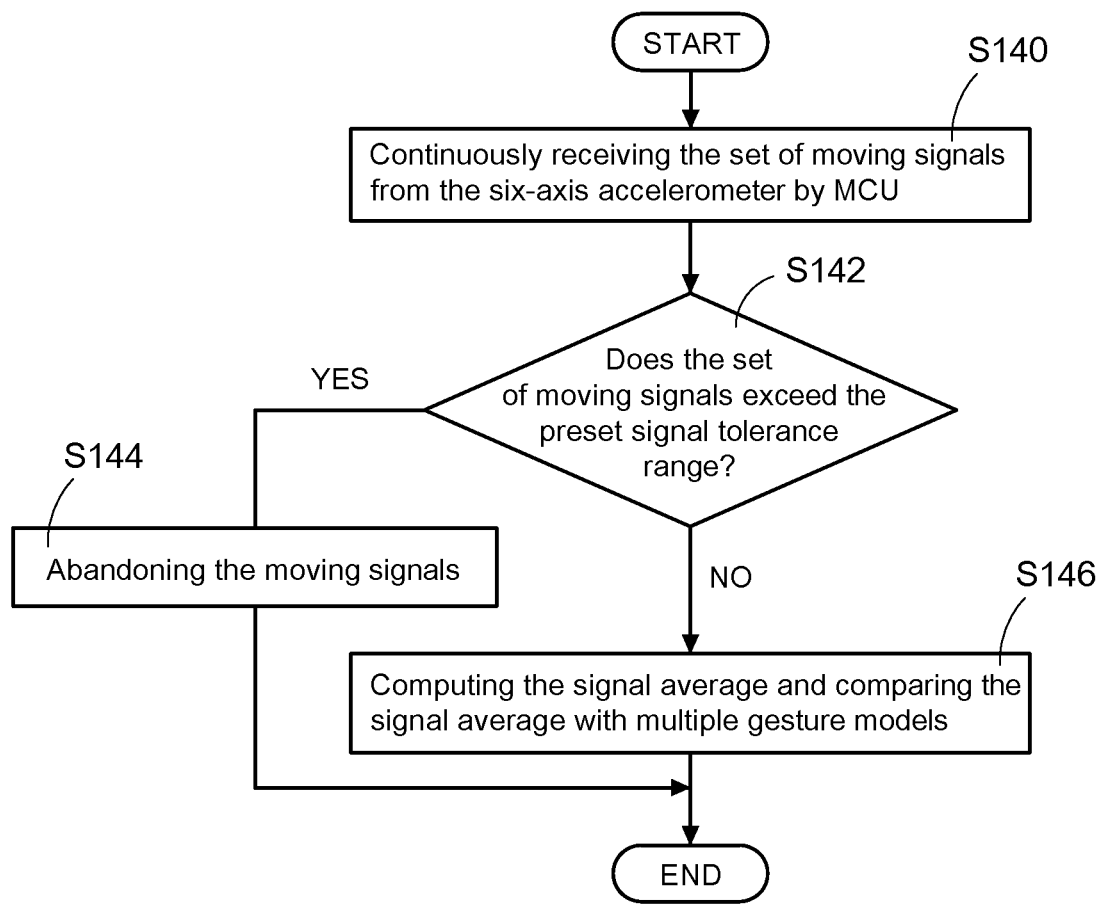
FIG. 5 is a flowchart of a signal diagnosis in a first embodiment according to this disclosure.

FIG. 5 is a flowchart of signal filtering in a first embodiment according to this disclosure. FIG. 5 is incorporated with a description below to detailed describe the step S14 shown in FIG. 3, which interprets how the MCU 11 analyzes the set of moving signals.

As shown in FIG. 5, after the six-axis accelerometer 12 senses the moving trajectory of the smart ring 1 and generates the set of moving signals, the MCU 11 continuously receives the set of moving signals from the six-axis accelerometer 12 (step S140). Next, the MCU 11 determines whether the set of moving signals exceeds the preset signal tolerance range 5 (step S142).

If the set of moving signals exceeds the signal tolerance range 5, the MCU 11 abandons the current set of moving signals (step S144). If the set of moving signals does not exceed the signal tolerance range 5, the MCU 11 computes a signal average of the set of moving signals, and compares the signal average with the multiple gesture models 141 stored in the first storage 14 (step S146). If the set of moving signals (i.e., the signal average) is determined to be matching any gesture models 141, the MCU 11 obtains a gesture command C1 that corresponds to the matched gesture model 141 after the step S16 shown in FIG. 3.

According the discussion above, the smart ring 1 of this disclosure only triggers the mobile device 2 to execute a corresponding function when the user's arm, wrist, palm, or finger 31 moves, and the upward variation and the downward variation of the movement does not exceed the signal tolerance range 5. As a result, the technical solution provided by this disclosure may prevent the smart ring 1 from being accidentally triggered by the user 3.

Figure 6:
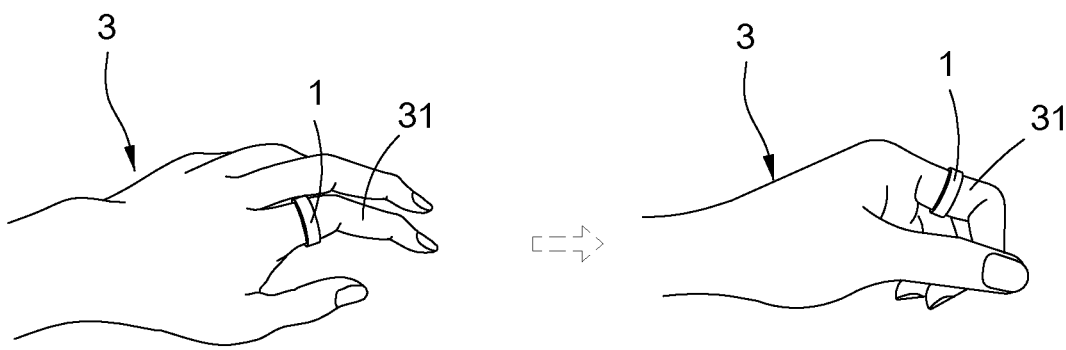
FIG. 6 is a schematic diagram showing a first gesture according to this disclosure.

Please refer to FIG. 6, which is a schematic diagram showing a first gesture according to this disclosure. In the embodiment of FIG. 6, the user 3 wears the smart ring 1 and makes a fisting action by bending the fingers 31. When the user 3 makes the fisting action, the set of moving signals sensed and generated by the six-axis accelerometer 12 of the smart ring 1 indicates a fisting trajectory.

In particular, the multiple gesture models 141 of the smart ring 1 include a first gesture model, and the first gesture model records a set of pre-defined fisting trajectory. When the user 3 makes the fisting action, the MCU 11 determines that the set of moving signals of the smart ring 1 indicates the fisting trajectory and matches the first gesture model, and the MCU 11 may then send out a gesture command C1 that corresponds to the first gesture model.

Figure 7:
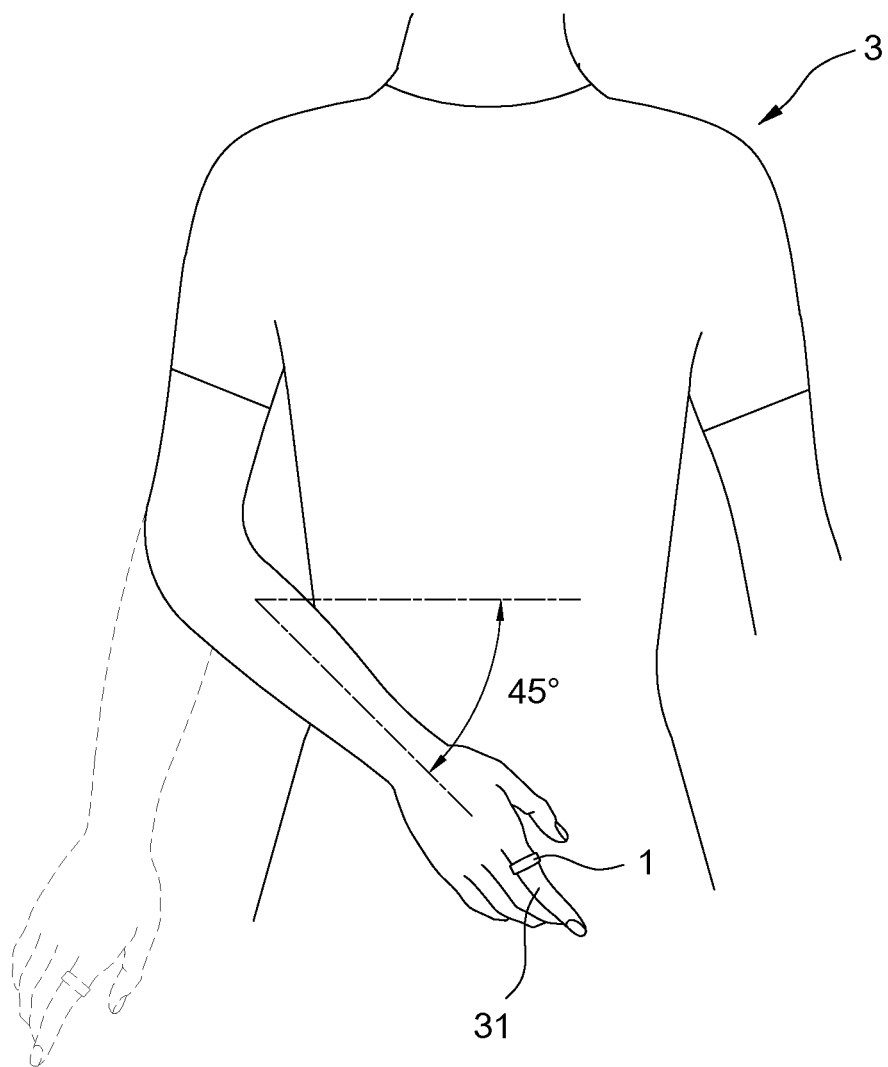
FIG. 7 is a schematic diagram showing a second gesture according to this disclosure.

Please refer to FIG. 7, which is a schematic diagram showing a second gesture according to this disclosure. In the embodiment of FIG. 7, the user 3 wears the smart ring 1, and the user 3 makes a swing action with the arm to move the arm to a position approximate 45 degrees above the waist or below the waist. When the user 3 makes the swing action, the set of moving signals sensed and generated by the six-axis accelerometer 12 of the smart ring 1 indicates a first swing trajectory.

In particular, the multiple gesture models 141 of the smart ring 1 includes a first swing gesture model, and the first swing gesture model records a set of pre-defined first swing trajectory. When the user 3 swings the arm to the position approximate 45 degrees above or below the waist, the MCU 11 determines that the set of moving signals of the smart ring 1 indicates the first swing trajectory and matches the first swing gesture model, and the MCU 11 may then send out a gesture command C1 that corresponds to the first swing gesture model.

Figure 8:
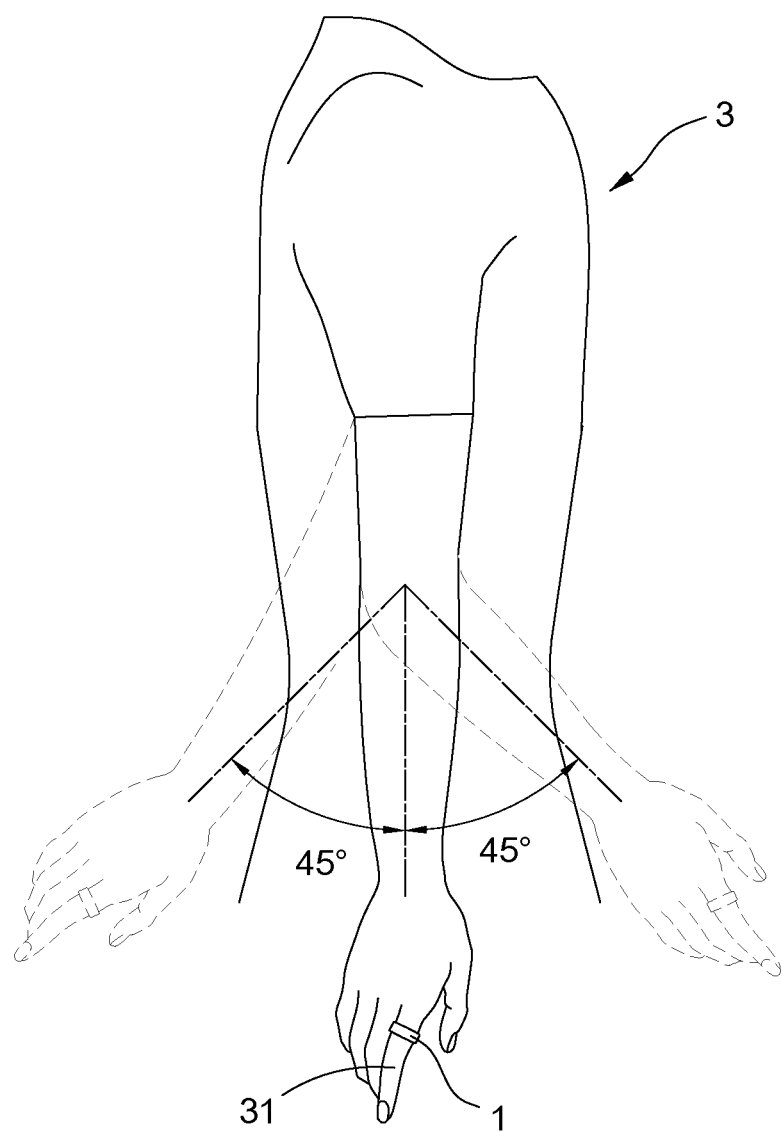
FIG. 8 is a schematic diagram showing a third gesture according to this disclosure.

Please refer to FIG. 8, which is a schematic diagram showing a third gesture according to this disclosure. In the embodiment of FIG. 8, the user 3 wears the smart ring 1, and the user 3 makes a swing action with the arm to move the arm to a position approximate 45 degrees forward or backward from a vertical posture. When the user 3 makes the swing action, the set of moving signals sensed and generated by the six-axis accelerometer 12 of the smart ring 1 indicates a second swing trajectory.

In particular, the multiple gesture models 141 of the smart ring 1 include a second swing gesture model, and the second swing gesture model records a set of pre-defined second swing trajectory. When the user 3 swings the arm to the position approximate 45 degrees forward or backward from the vertical posture, the MCU 11 determines that the set of moving signals of the smart ring 1 indicates the second swing trajectory and matches the second swing gesture model, and the MCU 11 may then send out a gesture command C1 that corresponds to the second swing gesture model.

One of the multiple technical features of this disclosure is that, when the user 3 wears the smart ring 1 and makes a specific gesture, the gesture may trigger the smart ring 1 to send out a specific gesture command C1, and the specific gesture command C1 may trigger the mobile device 2 to send out an SOS message for the user 3 to a specific contact person. In order to make sure that the user 3 may successfully trigger the mobile device 2 to send out the SOS message in any specific environment, in one of the exemplary embodiments, the aforementioned fisting action and the swing action may be identified as the specific gesture.

More specific, when the user 3 is in dangerous, such as falling down, car accident, being threatened, even hands being tied, the user 3 may still make the fisting action or the swing action (including the first swing action that swings the arm to a position approximate 45 degrees above or below the waist, and the second swing action that swings the arm to a position approximate 45 degrees forward or backward from a vertical posture) as discussed above. Therefore, this disclosure may benefit the user 3 by setting the fisting action and the swing action as the specific gesture to trigger the mobile device 2 to send out the SOS message.

Figure 9:
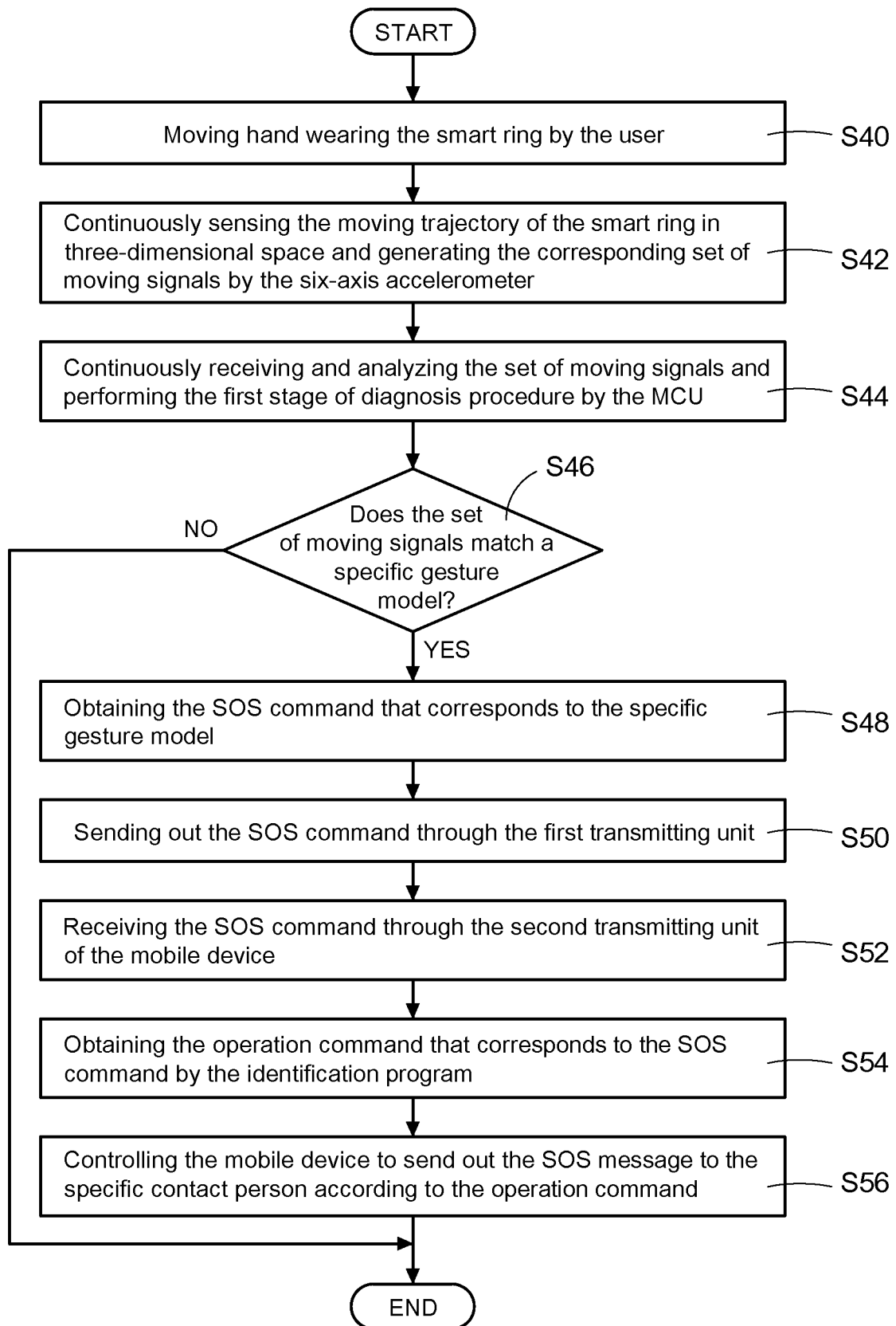
FIG. 9 is a flowchart of the controlling method in a second embodiment according to this disclosure.

FIG. 9 is a flowchart of the controlling method in a second embodiment according to this disclosure. FIG. 9 is used to describe how the wireless controlling system of this disclosure uses the user's hand action to trigger the mobile device 2 to send out an SOS message.

The embodiment of FIG. 9 is similar to the embodiment of FIG. 3. As described above, the user 3 may move the hand of wearing the smart ring 1 (step S40), and the six-axis accelerometer 12 of the smart ring 1 may sense the moving trajectory of the smart ring 1 in the three-dimensional space and generate a corresponding set of moving signals (step S42). Next, the MCU 11 of the smart ring 1 continuously receives and analyzes the set of moving signals, and performs a first stage of diagnosis procedure to the moving signals (step S44). In other words, the MCU 11 in the step S44 determines whether the set of moving signals is located within the signal tolerance range 5, and abandons the current set of moving signals when the set of moving signals is determined to be exceeding the signal tolerance range 5.

After the step S44, the MCU 11 determines whether the set of moving signals matches a specific gesture model stored in the first storage 14 (step S46), and obtains an SOS command that corresponds to the specific gesture model when the set of moving signals is determined to be matching the specific gesture model (step S48).

In one of the exemplary embodiments, the user 3 may perform a fisting action in the step S40, the set of moving signals sensed by the six-axis accelerometer 12 in the step S42 may indicate a fisting trajectory, and the MCU 11 may determine that the set of moving signals matches a first gesture model of the multiple gesture models 141 in the step S46. In this embodiment, the MCU 11 may obtain a fisting command that corresponds to the first gesture model in the step S48, and the identification program 241 in the mobile device 2 may identify the fisting command as the SOS command and then trigger the mobile device to send out the SOS message according to the fisting command.

In another exemplary embodiment, the MCU 11 obtains the fisting command that corresponds to the first gesture model in the step S48, only when, in the step S46, the set of moving signals is determined to be matching the first gesture model, and the fisting trajectory of the smart ring 1 continues for a preset threshold time (such as 5 second, 10 second, etc.). In other words, in this embodiment, the MCU 11 only obtains the fisting command when the hand of the user 3 wearing the smart ring 1 makes a fist for the preset threshold time. Therefore, an accidental triggering may be further prevented.

In another exemplary embodiment, the user 3 may perform a swing action in the step S40 (including the first swing action that swings the arm to a position approximate 45 degrees above or below the waist, and the second swing action that swings the arm to a position approximate 45 degrees forward or backward from a vertical posture), the set of moving signals sensed by the six-axis accelerometer 12 in the step S42 may indicate a swing trajectory, and the MCU 11 may determine that the set of moving signals matches a swing gesture model of the multiple gesture models 141 in the step S46. In this embodiment, the MCU 11 may obtain a swing command that corresponds to the swing gesture model in the step S48, and the identification program 241 in the mobile device 2 may identify the swing command as the SOS command and then trigger the mobile device to send out the SOS message according to the swing command.

In another exemplary embodiment, the MCU 11 obtains the swing command that corresponds to the swing gesture model in the step S48, only when, in the step S46, that the set of moving signals is determined to be matching the swing gesture model, and the swing trajectory of the smart ring 1 is located within a preset threshold angle (such as 45 degrees). In other words, in this embodiment, the MCU 11 only obtains the swing command when the user 3 swings the hand wearing the smart ring 1 by the preset threshold angle. Therefore, an accidental triggering may be further prevented.

It should be mentioned that the fisting trajectory is accomplished by the fingers 31 of the user 3, and the swing trajectory is accomplished by the arm of the user 3. In order to prevent accidental triggering, the MCU 11 may be set to determine whether the user 3 performs the swing action and the angle of the swing action matches the preset threshold angle first, and then determines whether the user 3 performs the fisting action, and then the MCU 11 only obtains the corresponded SOS message when the user 3 performs the fisting action and the time for the fisting action reaches the preset threshold time. The above descriptions are only few embodiments of this disclosure, but not limited thereto.

After the step S48, the smart ring 1 sends out the SOS command (i.e., the fisting command or the swing command) through the first transmitting unit 13 (step S50), and the mobile device 2 communicated with the smart ring 1 may receive the SOS command through the second transmitting unit 23 (step S52). After the step S52, the identification program 241 in the mobile device 2 may perform a second stage of diagnosis procedure, and execute a table looking up action based on the diagnosed SOS command to obtain an operation command that corresponds to the SOS command (step S54).

The second stage of diagnosis procedure is to filter noises from the SOS command, so as to prevent the misjudgment caused by noises generated from signal transmission. Also, in the step S54, the identification program 241 obtains the operation command that may control the mobile device 2 to send out the SOS message to a specific contact person according to the received SOS command (i.e., the fisting command or the swing command). In other words, the content of the operation command at least includes the specific contact person and the SOS message.

After the step S54, the identification program 241 may make the processor 21 to control the mobile device 2 according to the operation command, so the mobile device 2 may send out an SOS message recorded in the operation command to a specific contact person indicated in the operation command, such as an emergency contact person recorded in the phone book 243 (step S56).

In one of the exemplary embodiments, the SOS message includes an SOS content presented by texts, pictures, voices, or the combination. In another exemplary embodiment, the SOS message may include the SOS content and a positioning information of the mobile device 2 at the very time, i.e., the operation command in this embodiment includes the SOS message and the positioning information.

It should be mentioned that, in the step S56, the processor 21 may control the mobile device 2 to make a phone call or send a text message to the emergency contact person, police office, or hospital, through the communication unit 25, or to activate a specific application program 242 such as LINE, Whatsapp, Facebook Messenger, Skype, etc., to make a phone call or send a message to the emergency contact person, police office, or hospital through the application program 242 over the Internet, but not limited thereto.

By using the technical solution provided by this disclosure, even if the user is in an emergency situation which cannot touch the mobile device, the user may still control the mobile device to automatically send out an SOS message to a specific contact person through the smart ring and the identification program pre-installed in the mobile device. As a result, the technical solution provided by this disclosure may help the user to get rid of trouble and ensure the user's safety.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A wireless controlling system implemented with a smart ring, the wireless controlling system comprising:
   an identification program, installed and executed by a mobile device; and
   the smart ring, communicated with the mobile device, and comprising:
   a six-axis accelerometer, sensing a movement of the smart ring in a three-dimensional space and generating a set of moving signals;
   a storage, recording multiple gesture models, each of the gesture models respectively corresponding to a moving trajectory;
   a micro control unit (MCU), electrically connected with the six-axis accelerometer and the storage, continuously receiving the set of moving signals and determining whether the set of moving signals matches one of the multiple gesture models, and obtaining a gesture command corresponding to a specific gesture model in the multiple gesture models when the set of moving signals matches the specific gesture model; and
   a transmitting unit, electrically connected with the MCU, wirelessly transmitting the gesture command to the mobile device;
   wherein, the mobile device is configured to analyze the gesture command to obtain an operation command corresponding thereto through the identification program, and the mobile device is being controlled to execute a corresponding function according to the operation command.

2. The wireless controlling system in claim 1, wherein the smart ring further comprises:
   a battery, electrically connected with the MCU, providing power to the smart ring; and
   a physiology sensing unit, electrically connected with the MCU, sensing a physiological data of a user when the user wears the smart ring on a finger, wherein the transmitting unit is configured to wirelessly transmit the physiological data to the mobile device.

3. The wireless controlling system in claim 1, wherein the transmitting unit comprises a Bluetooth low energy (BLE) transmitting unit.

4. The wireless controlling system in claim 1, wherein the MCU is configured to determine that the set of moving signals matches a first gesture model in the multiple gesture models when the set of moving signals indicates a fisting trajectory, and to obtain a fisting command corresponding to the first gesture model when the fisting trajectory continues for a preset threshold time, wherein the identification program is configured to generate the operation command according to the fisting command, the operation command controls the mobile device to send out an SOS message to a specific contact person.

5. The wireless controlling system in claim 4, wherein the identification program is configured to obtain a positioning information generated by a GPS unit of the mobile device, and the operation command comprises the positioning information.

6. The wireless controlling system in claim 1, wherein the MCU is configured to determine that the set of moving signals matches a swing gesture model in the multiple gesture models when the set of moving signals indicates a swing trajectory, and to obtain a swing command corresponding to the swing gesture model when an angle of the swing trajectory is less than or equal to a preset threshold angle, wherein the identification program is configured to generate the operation command according to the swing command, the operation command controls the mobile device to send out an SOS message to a specific contact person.

7. The wireless controlling system in claim 6, wherein the identification program is configured to obtain a positioning information generated by a GPS unit of the mobile device, and the operation command comprises the positioning information.

8. A wireless controlling method, incorporated with a wireless controlling system comprising a smart ring and an identification program, wherein the smart ring comprises a micro control unit (MCU), a six-axis accelerometer, a transmitting unit and a storage, the identification program is installed and executed by a mobile device, and the wireless controlling method comprising:
   a) sensing a movement of the smart ring in a three-dimensional space and generating a set of moving signals by the six-axis accelerometer;
   b) continuously receiving the set of moving signals by the MCU, and determining whether the set of moving signal matches one of multiple gesture models stored in the storage, wherein each of the gesture models respectively corresponds to a moving trajectory;
   c) obtaining a gesture command corresponding to a specific gesture model in the multiple gesture models when the set of moving signals is determined to be matching the specific gesture model;
   d) wirelessly transmitting the gesture command to the mobile device by the transmitting unit;
   e) analyzing the gesture command to obtain an operation command correspondingly by the identification program; and
   f) controlling the mobile device to execute a corresponding function according to the operation command.

9. The wireless controlling method in claim 8, wherein the step b) comprises:
   b1) continuously receiving the set of moving signals by the MCU;
   b2) determining whether the set of moving signals exceeds a signal tolerance range;
   b3) abandoning the set of moving signals when the set of moving signals exceeds the signal tolerance range; and
   b4) computing a signal average of the set of moving signals when the set of moving signals is in the signal tolerance range, and comparing the signal average with the multiple gesture models.

10. The wireless controlling method in claim 8, wherein the step b) comprises determining whether the set of moving signals indicates a fisting trajectory that matches a first gesture model in the multiple gesture models; the step c) comprises obtaining a fisting command corresponding to the first gesture model when the set of moving signals matches the first gesture model and the fisting trajectory continues for a preset threshold time; and the step e) comprises generating the operation command according to the fisting command, the operation command controls the mobile device to send out an SOS message to a specific contact person.

11. The wireless controlling method in claim 10, wherein the step e) comprises generating the operation command based on the SOS message and a positioning information of the mobile device.

12. The wireless controlling method in claim 8, wherein the step b) comprises determining whether the set of moving signals indicates a swing trajectory that matches a swing gesture model in the multiple gesture models; the step c) comprises obtaining a swing command corresponding to the swing gesture model when the set of moving signals matches the swing gesture model and an angle of the swing trajectory is less than or equal to a preset threshold angel; and the step e) comprises generating the operation command according to the swing command, the operation command controls the mobile device to send out an SOS message to a specific contact person.

13. The wireless controlling system in claim 12, wherein the step e) comprises generating the operation command based on the SOS message and a positioning information of the mobile device.

* * * * *